US007718739B2

(12) United States Patent
Grady et al.

(10) Patent No.: US 7,718,739 B2
(45) Date of Patent: May 18, 2010

(54) POLYALKENOATE CEMENT COMPOSITIONS AND METHODS OF USE IN CEMENTING APPLICATIONS

(75) Inventors: Brian Grady, Norman, OK (US); Diego Acosta, Norman, OK (US); Gary P. Funkhouser, Duncan, OK (US)

(73) Assignees: Halliburton Energy Services, Inc, Duncan, OK (US); Board of Regents of the University of Oklahoma, Norman, OK (US)

( * ) Notice: Subject to any disclaimer, the term of this patent is extended or adjusted under 35 U.S.C. 154(b) by 487 days.

(21) Appl. No.: 10/937,128

(22) Filed: Sep. 9, 2004

(65) Prior Publication Data
US 2006/0048681 A1 Mar. 9, 2006

(51) Int. Cl.
C04B 28/26 (2006.01)
(52) U.S. Cl. ............... 525/330.2; 525/329.2; 523/165
(58) Field of Classification Search ............ 525/330.2, 525/329.2; 523/166, 165
See application file for complete search history.

(56) References Cited

U.S. PATENT DOCUMENTS

| 3,962,267 | A |   | 6/1976  | Suzuki et al. ......... 260/29.6 TA |
|-----------|---|---|---------|------------------------------------|
| 4,143,018 | A |   | 3/1979  | Crisp et al. ................ 260/29.6 |
| 4,340,693 | A | * | 7/1982  | Drake et al. ................. 525/337 |
| 5,179,135 | A |   | 1/1993  | Ellis et al. .................... 523/116 |
| 5,314,031 | A | * | 5/1994  | Hale et al. ..................... 175/61 |
| 5,314,474 | A | * | 5/1994  | Helms et al. ............. 623/23.62 |
| 5,814,682 | A |   | 9/1998  | Rusin et al. ................. 523/116 |
| 6,017,982 | A |   | 1/2000  | Akinmade .................. 523/216 |
| 6,043,296 | A |   | 3/2000  | Davies et al. ............... 523/116 |
| 6,313,192 | B1 |  | 11/2001 | Anstice et al. ............. 523/116 |
| 6,799,636 | B2 |  | 10/2004 | Funkhouser et al. |
| 7,238,229 | B2 |  | 7/2007  | Funkhouser et al. |
| 2004/0079258 | A1 | * | 4/2004 | Hoescheler et al. .......... 106/35 |

FOREIGN PATENT DOCUMENTS

WO    WO 0249581 A1 * 6/2002    ............. 106/35

OTHER PUBLICATIONS

Cavell, et al., Increased Rates of Initiation of Polymerization by 4-4'-Dicyano-4-4'-azopentanoic Acid in the Presence of Ferric Salts, Journal of Polymer Science: Part A-1, vol. 4, pp. 541-550, 1966.
Sullivan, et al., Influence of poly(acrylic acid) molar mass on the fracture properties of glass polyalkenoate cements based on waste gasifer slags, Journal of Materials Science, vol. 35, pp. 1125-1134, 2000.
Culbertson, Bill M., Glass-ionomer dental restoratives, Progress in Polymer Science, vol. 26, pp. 577-604, 2001.
Aisawa, et al., Synthesis and Thermal Decomposition of Mn-Al Layered Double Hydroxides, Journal of Solid State Chemistry, vol. 167, pp. 152-159, 2002.

* cited by examiner

Primary Examiner—Kelechi C Egwim
(74) Attorney, Agent, or Firm—Craig W. Roddy; Baker Botts, LLP

(57) ABSTRACT

Methods and compositions for cementing applications. In one embodiment, the present invention provides a method of cementing comprising the steps of: providing a cement composition that comprises: a polyelectrolyte and/or an alkenoic acid first monomer; a filler; and a crosslinking agent; placing the cement composition in a desired location; and allowing the cement composition to set therein.

56 Claims, No Drawings

POLYALKENOATE CEMENT COMPOSITIONS AND METHODS OF USE IN CEMENTING APPLICATIONS

BACKGROUND

The present invention relates to methods and compositions for cementing applications. More particularly, the present invention relates to polyalkenoate cement compositions comprising soluble crosslinking agents, and methods of using such compositions in cementing applications.

Cements are commonly utilized in a number of different applications including structural (e.g., in the construction of buildings and roads), medical applications (e.g., dental and bone), and energy (e.g., subterranean well completion and remedial operations). The primary components of typical cement compositions include a hydraulic cement, water, rock, and sand. The undesirable attributes of these typical cement compositions include poor flexibility, low tensile strength, and the inability to effectively control hardening time.

Conventional polyalkenoate cement compositions generally include: water, a polyelectrolyte, and a partially soluble acid-degradable glass, which acts as both a crosslinking agent and a filler. The mechanism of crosslinking, and therefore hardening, in these compositions is dependent on the dissolution of the partially soluble acid-degradable glass. Thus, it is difficult to control the rate of hardening. In addition, large quantities of expensive acid-degradable glass often are required in these compositions. Supplementing with a non-soluble filler generally is not desirable as it would reduce the amount of active components in the composition.

In some applications, successful placement of a cement composition in a desired location requires controlling the setting time of the cement composition. However, to develop sufficient strength for an application, it is preferable for the setting time to be relatively quick. These competing factors must be balanced to provide a cement composition with sufficient mechanical properties, while also ensuring that the cement composition is able to be successfully placed in a desired location. Thus, the ability to control the setting characteristics of a cement composition is desirable. Moreover, the cement composition must have enhanced mechanical properties to sustain the stressful conditions that may be encountered in a particular application. For instance, the cement composition should develop high bond strength after setting and should also have sufficient mechanical properties, including but not limited to, elasticity, flexibility, compressibility, and ductility, to resist cracking and/or shattering as a result of any stressful conditions.

Hydraulic cement compositions are commonly utilized in construction and subterranean applications. Examples of common subterranean applications include, but are not limited to, subterranean well completion and remedial operations. For instance, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. To ensure that the annular space is completely filled, oftentimes a cement slurry is pumped into the annular space until it circulates to the surface. The cement composition is then permitted to set in the annular space, thereby forming an annular sheath of hardened substantially impermeable cement. The hardened cement substantially supports and positions the pipe string in the well bore and bonds the exterior surfaces of the pipe string to the walls of the well bore. Hydraulic cement compositions are also used in remedial cementing operations, such as, plugging highly permeable zones or fractures in well bores, plugging cracks and holes in pipe strings, and the like.

SUMMARY OF THE INVENTION

The present invention relates to methods and compositions for cementing applications. More particularly, the present invention relates to polyalkenoate cement compositions comprising soluble crosslinking agents, and methods of using such compositions in cementing applications.

In one embodiment, the present invention provides a method of cementing comprising the steps of: providing a cement composition that comprises: a polyelectrolyte and/or an alkenoic acid first monomer; a filler; and a crosslinking agent; placing the cement composition in a desired location; and allowing the cement composition to set therein.

In another embodiment, the present invention provides a method of enhancing the properties of a cement composition comprising the step of adding at to a cement composition at least one polyelectrolyte, a alkenoic acid first monomer, a filler, and a crosslinking agent A cement composition comprising a polyelectrolyte and/or an alkenoic acid alkenoic acid first monomer; a filler; and a crosslinking agent.

Other and further features and advantages of the present invention will be readily apparent to those skilled in the art upon a reading of the description of preferred embodiments which follows.

DESCRIPTION OF THE PREFERRED EMBODIMENTS

The present invention relates to methods and compositions for cementing applications. More particularly, the present invention relates to polyalkenoate cement compositions comprising soluble crosslinking agents, and methods of using such compositions in cementing applications. While the compositions and methods of the present invention are useful in any cementing application (e.g., construction, medical, and energy applications), they are particularly useful in subterranean well completion and remedial applications, including primary cementing, e.g., cementing casings and liners in well bores, including those in multi-lateral subterranean wells.

The improved cement compositions of the present invention generally comprise a polyelectrolyte and/or an alkenoic acid first monomer; a filler; and a crosslinking agent. In certain embodiments, the cement compositions also may comprise a hardener. It may become apparent to those skilled in the art upon a reading of this description of the present invention that other additives suitable for use in conjunction with cementing applications may be added to these compositions if desired. When the cement compositions of the present invention set, the resultant cement may have improved mechanical properties, including, but not limited to, improved Young's modulus, tensile strength, compressive strength, and ductility, that enhance the cement's ability to sustain cyclic stresses it may encounter, for example, those due to temperature and pressure.

The cement compositions of the present invention comprise a polyelectrolyte. In preferred embodiments, alkenoic acid monomers may be added that will form suitable polyelectrolytes after addition to the cement compositions of the present invention. In other preferred embodiments, an already polymerized (at least to a suitable degree) polyelectrolyte may be added to the cement compositions of the present invention. For instance, suitable monomers may react to form suitable oligomeric or polymeric polyelectrolytes, which may then be added to the cement compositions of the present invention. The strength of the cement composition of the present invention may be controlled by, inter alia, the choice of monomers and/or polyelectrolytes. In certain preferred embodiments, suitable monomers that may be used in accordance with the present invention include monomers containing at least one acid functionality. For example, suitable monomers may include, inter alia, acrylic acid, methacrylic acid, itaconic acid, maleic acid, 3-butene-1,2,3-tricarboxylic acid, or combinations thereof. In other preferred embodiments, anionic monomers may be used in accordance with the present invention. Suitable anionic monomers include, but are not limited to, sulfonate, phosphate, phosphonate, or combinations thereof. The monomer should be included in the cement compositions of the present invention in an amount sufficient to form a crosslinkable polyelectrolyte. In certain exemplary embodiments, the present invention may comprise anionic polyelectrolytes. In certain exemplary embodiments, the monomer or polyelectrolyte may be present in the cement compositions in the range of from about 10% to about 75% of the volume of the cement composition. In other exemplary embodiments, the monomer or polyelectrolyte may be present in the cement compositions in the range of from about 20% to about 50% of the volume of the cement composition.

In alternative embodiments, the polyelectrolytes of the cement compositions of the present invention may include a combination of crosslinkable monomer and a monomer not crosslinkable by the means used to crosslink the polyelectrolyte (i.e., non-active monomer). Optionally, the monomers may be crosslinkable but not through the means used to crosslink the polyelectrolyte. In certain exemplary embodiments, suitable non-active monomers may comprise a member of the acrylamide family of materials, e.g., acrylamide. N,N'-methylenebisacrylamide may be useful to increase the degree of branching in the polyelectrolyte, if desired. In other exemplary embodiments, the non-active monomer of the present invention may comprise a member of the acrylate family of materials, e.g., hydroxyethyl acrylate or hydroxyethyl methacrylate. In further embodiments, the percentage of monomer that is non-active may be up to about 75% by volume of the total monomer.

The cement compositions of the present invention comprise a filler. In certain preferred embodiments, a filler is chosen that interacts with the cement composition. These are referred to as herein as "active fillers." One example of a suitable active filler of the present invention may include manganese tetroxide. In an alternative embodiment, the filler may include a mixture of an active filler and a non-active filler. In certain exemplary embodiments, the non-active filler of the present invention may include iron oxide, silica flour, fly ash or combinations thereof. In certain exemplary embodiments, the percentage of total filler that is non-active may be up to about 75% by volume of the total filler.

The filler should be present in a sufficient volume percentage to yield enhanced properties to the cement composition. However, one should be mindful that if the volume percentage of the filler is too high the cement compositions may have inferior mechanical and/or rheological properties. In certain exemplary embodiments, the filler may be present in the cement compositions in the range of from about 5% to about 65% of the volume of the cement composition. In other exemplary embodiments, the filler may be present in the cement compositions in the range of from about 15% to about 50% of the volume of the cement composition.

The cement compositions of the present invention comprise a crosslinking agent. In certain preferred embodiments, the crosslinking agent is substantially soluble and capable of interacting with a polyelectrolyte. In some embodiments, the crosslinking agent may interact with more than one anionic group of a polyelectrolyte. In certain exemplary embodiments, suitable crosslinking agents may comprise suitable cations. Suitable cations may be metal cations, organic cations, or combinations thereof. In a preferred embodiment, the metal cations may comprise trivalent aluminum cations. In certain exemplary embodiments, the crosslinking agent may be present in the cement compositions in the range of from about 0.01% to about 5% by weight of the cement composition. In other exemplary embodiments, the crosslinking agent may be present in the cement compositions in the range of from about 0.7% to about 2% by weight of the cement composition.

Optionally, the cement compositions of the present invention comprise a "hardening agent." In certain preferred embodiments, the hardening agent may be present in an amount sufficient, inter alia, to assist in controlling the setting time of a cement composition of the present invention. In certain exemplary embodiments, the hardening agents may comprise a free-radical polymerization initiator. For example, the hardening agents may include, but are not limited to, those compounds comprising an azo derivative. Examples of suitable hardening agents may include, but are not limited to, 2,2'-azobis[2-(2-imidazolin-2-yl)propane dihydrochloride; 2,2'-azobis(2-methylpropionamidine)dihydrochloride; 4,4'-azobis(4-cyanovaleric acid), 2,2'-azobis[2-methyl-N-(2-hydroxyethyl)propionamide, 1-[(1-cyano-1-methylethyl)azo]formamide; 2,2'-azobis[2-(5-methyl-2-imidazolin-2-yl)propane]dihydrochloride; 2,2'-azobis(2-methylpropionamidine)dihydrochloride; 1-[(1-cyano-1-methylethyl)azo]formamide; or combinations thereof. In other embodiments, suitable hardening agents may comprise an oxidizing compound. Examples of suitable oxidizing compounds may include, but are not limited to, sodium persulfate, ammonium persulfate, t-butylhydroperoxide, hydrogen peroxide, or combinations thereof. In some embodiments, suitable oxidizing compounds may comprise a reducing agent. Examples of suitable reducing agents may include, but are not limited to, sodium thiosulfate, sodium bisulfite, triethanolamine, or combinations thereof.

The cement compositions of the present invention may comprise a water source. The water source used in the present invention may comprise fresh water, salt water (e.g., water containing one or more salts dissolved therein), brine (e.g., saturated salt water), or seawater. Generally, the water can be from any source provided that it does not contain an excess of compounds that may adversely affect other components in the cement composition. The water may be present in an amount sufficient, inter alia, to promote solubility of the crosslinking agent, reduce cost, improve dispersability of the solid, change the rheology of the mixture, act as a heat sink, and/or form a pumpable slurry. However, one should note that the amount of water should not be high enough to prevent setting of the cement. In certain embodiments, the water source may be present in the cement compositions in an amount in the range of from about 0% to about 50% by volume of the cement composition. In certain exemplary embodiments, the water may be present in the cement compositions in the range of from about 15% to about 35% by volume of the cement composition.

Optionally, a rheology modifier may be added to the cement compositions of the present invention, e.g., to prevent or reduce the settling of the filler. Suitable rheology modifiers may include, but are not limited to, certain polysaccharides, galactomannan gums, and cellulose derivatives. Specific examples include xanthan gum, hydroxyethylcellulose, or combinations thereof.

Optionally, an inhibitor may be added to the cement compositions of the present invention, e.g., to delay polymerization and allow the cement to be handled or pumped prior to setting. Suitable inhibitors include, but are not limited to, N-nitrosophenylhydroxylamine, iron chloride, ammonium salts, phenothiazine, quinone, 2-mercaptobenzothiazole, methylene blue, or combinations thereof.

Optionally chain-transfer agents may be added to the cement compositions of the present invention. In certain exemplary embodiments, the chain-transfer agent may comprise 2-mercaptoethanol.

Additional additives may be added to the cement compositions of the present invention as deemed appropriate by one skilled in the art with the benefit of this disclosure. Examples of such additives include, inter alia, fluid loss control additives, defoamers, dispersing agents, retarders, set accelerators, and the like.

An example of a method of the present invention of cementing comprises the steps of: providing a cement composition that comprises: a polyelectrolyte and/or an alkenoic acid first monomer; a filler; and a crosslinking agent; placing the cement composition in a desired location; and allowing the cement composition to set therein.

In one embodiment of the cement compositions of the present invention, the polyelectyrolyte comprises a monomer wherein the monomer is an acrylic acid, present in an amount of about 20-35% by weight of the cement composition; the filler is manganese tetroxide, present in an amount of about 15% to about 50% by volume of the cement composition; the cross linking agent is trivalent aluminum in an amount of about 0.7-2% by weight of the cement composition; and the hardening agent is an azo-compound, present in an amount of about 0.001 to 0.1% by weight of the cement composition.

To facilitate a better understanding of the present invention, the following examples of some of the preferred embodiments are given. In no way should such examples be read to limit, or define, the scope of the invention.

Example 1

Exemplary cement compositions of the present invention were prepared according to Table 1. Table 2 lists the relative amounts of the components used for the exemplary compositions prepared according to Table 1. Table 3 lists the mechanical properties obtained for the exemplary compositions prepared according to Table 1.

TABLE 1

| Component | Composition #1 | Composition #2 | Composition #3 | Composition #4 | Composition #5 | Composition #6 | Composition #7 |
| --- | --- | --- | --- | --- | --- | --- | --- |
| $Mn_3O_4$ (g/1000 mL of slurry) | 416.00 | 416.00 | 375.27 | 1248.00 | 416.00 | 403.00 | 403.00 |
| MICROFLYASH (g/1000 mL of slurry) | 440.27 | 440.27 | 461.82 | 0.00 | 440.27 | 330.20 | 330.20 |
| ACRYLIC ACID (ml/1000 mL of slurry) | 328.89 | 328.89 | 328.89 | 211.43 | 328.89 | 328.89 | 328.89 |
| WATER (ml/1000 mL of slurry) | 229.07 | 320.09 | 374.70 | 470.06 | 388.36 | 374.70 | 374.70 |
| 26% w/w $AlCl_3$ (ml/1000 mL of slurry) | 193.71 | 96.85 | 38.74 | 62.26 | 24.21 | 38.74 | 38.74 |
| Hydroxyethyl Acrylate (g/1000 mL of slurry) | 0 | 0 | 0 | 0 | 0 | 0 | 26.76 |
| N,N'-Methylenebisacrylamide (g/1000 mL of slurry) | 0 | 0 | 0 | 0 | 0 | 195.71 | 0 |
| 2,2'-Azobis(2-amidinopropane) dihydrochloride (g/1000 mL of slurry) | 0.65 | 0.26 | 0.26 | 0.42 | 0.13 | 0.65 | 0.65 |
| Xanthan Gum (g/1000 mL of slurry) | 8.56 | 8.56 | 8.37 | 12.48 | 8.56 | 7.33 | 7.33 |

TABLE 2

| | Comp. 1 | Comp. 2 | Comp. 3 | Comp. 4 | Comp. 5 | Comp. 6 | Comp. 7 |
| --- | --- | --- | --- | --- | --- | --- | --- |
| CATION RATIO mol Acrylic Acid/ mol CATION | 10 | 20 | 50 | 20 | 80 | 50 | 50 |

TABLE 2-continued

|  | Comp. 1 | Comp. 2 | Comp. 3 | Comp. 4 | Comp. 5 | Comp. 6 | Comp. 7 |
|---|---|---|---|---|---|---|---|
| INITIATOR RATIO mol Acrylic Acid/ mol INITIATOR | 2000 | 5000 | 5000 | 2000 | 10000 | 2000 | 2000 |
| WATER RATIO VOL. Acrylic Acid/ VOL. WATER | 0.8 | 0.8 | 0.8 | 0.4 | 0.8 | 0.8 | 0.8 |
| $Mn_3O_4$/MICRO-FLYASH VOL. RATIO VOL. $Mn_3O_4$/VOL. MICROFLYASH | 50:50 | 50:50 | 30:70 | 100:0 | 50:50 | 50:50 | 50:50 |
| FILLER VOLUME PERCENTAGE VOL. FILLER(S)/ TOTAL VOLUME | 26% | 26% | 20% | 22% | 26% | 26% | 26% |
| COMONOMER RATIO mol MBA/mol Acrylic Acid | 0 | 0 | 0 | 0 | 0 | 0.6 | 0.05 |

TABLE 3

| Property | Comp. 1 | Comp. 2 | Comp. 3 | Comp. 4 | Comp. 5 | Comp. 6 | Comp. 7 |
|---|---|---|---|---|---|---|---|
| COMPRESSIVE STRENGTH (PSI) | 700 | 400 | 780 | 180 | 66.0 | 6100 | 2050 |
| FAIL STRAIN (%) | 1.8 | 7.5 | 51.2 | 27.0 | 14.6 | 15.5 | 22.5 |
| COMPRESSIVE MODULUS (PSI) | 51500 | 5150 | 1400 | 770 | 970 | 34300 | 9030 |

The above examples demonstrates, inter alia, that the cement compositions of the present invention have improved properties. Therefore, the present invention is well adapted to carry out the objects and attain the ends and advantages mentioned as well as those that are inherent therein.

While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalence in all respects.

What is claimed is:

1. A method of cementing in a well bore comprising:
   providing a cement composition that comprises:
   a polyelectrolyte and/or an alkenoic acid first monomer; a manganese tetroxide filler; and a crosslinking agent;
   placing the cement composition in at least a portion of the well bore; and
   allowing the cement composition to set therein.

2. The method of claim 1 wherein the polyelectrolyte is formed from a second monomer.

3. The method of claim 1 wherein the alkenoic acid first monomer polymerizes to form a second polyelectrolyte.

4. The method of claim 1 wherein the polyelectrolyte is an anionic polyelectrolyte.

5. The method of claim 1 wherein the alkenoic acid first monomer has an acid functionality.

6. The method of claim 1 wherein the alkenoic acid first monomer comprises acrylic acid, methacrylic acid, itaconic acid, maleic acid, 3-butene-1,2,3-tricarboxylic acid, or combinations thereof.

7. The method of claim 1 wherein the alkenoic acid first monomer comprises sulfonate, phosphate, phosphonate, or combinations thereof.

8. The method of claim 2 wherein the second monomer comprises an acid functionality.

9. The method of claim 2 wherein the second monomer comprises acrylic acid, methacrylic acid, itaconic acid, maleic acid, 3-butene-1,2,3-tricarboxylic acid, or combinations thereof.

10. The method of claim 2 wherein the second monomer comprises sulfonate, phosphate, phosphonate, or combinations thereof.

11. The method of claim 1 wherein the polyelectrolyte is present in the cement composition in an amount in the range of from about 10% to about 75% by volume of the cement composition.

12. The method of claim 1 wherein the polyelectrolyte is present in the cement composition in an amount in the range of from about 20% to about 50% by volume of the cement composition.

13. The method of claim 1 wherein the filler further comprises a non-active component.

14. The method of claim 13 wherein the non-active component comprises iron oxide, silica flour, flyash, or combinations thereof.

15. The method of claim 13 wherein the non-active component comprises up to about 75% by volume of the total filler.

16. The method of claim 1 wherein the filler is present in the cement composition in an amount in the range of from about 5% to about 65% by volume of the cement composition.

17. The method of claim 1 further comprising a hardening agent.

18. The method of claim 17 wherein the hardening agent comprises 2,2'-azobis[2-(2-imidazolin-2-yl)propane dihydrochloride; 2,2'-azobis(2-methylpropionamidine) dihydrochloride; 4,4'-azobis(4-cyanovaleric acid), 2,2'-azobis[2-methyl-N-(2-hydroxyethyl)propionamide, 1-[(1-cyano-1-methylethyl)azo]formamide; 2,2'-azobis[2-(5-methyl-2-imidazolin-2-yl)propane]dihydrochloride; 2,2'-azobis(2-methylpropionamidine) dihydrochloride; 1-[(1-cyano-1-methylethyl)azo]formamide; or combinations thereof.

19. The method of claim 17 wherein the hardening agent is an oxidizing compound comprising sodium persulfate, ammonium persulfate, t-butylhydroperoxide, hydrogen peroxide, or combinations thereof.

20. The method of claim 17 wherein the hardening agent is a reducing agent that comprises sodium thiosulfate, sodium bisulfite, triethanolamine or combinations thereof.

21. The method of claim 1 wherein the cros slinking agent is completely soluble.

22. The method of claim 1 wherein the crosslinking agent comprises a metal cation, an organic cation, or a combination thereof.

23. The method of claim 1 wherein the crosslinking agent comprises an aluminum cation.

24. The method of claim 1 wherein the crosslinking agent is present in the cement composition in an amount in the range of from about 0.01% to about 5% by volume of the cement composition.

25. The method of claim 1 wherein the cement composition further comprises water.

26. The method of claim 25 wherein the water is present in the cement composition in an amount up to about 50% by weight of the cement.

27. The method of claim 1 wherein the cement composition further comprises a fluid loss control additive, a defoamer, a dispersing agent, a retarder, a set accelerator, a rheology modifier, an inhibitor, a chain transfer agent, or a combination thereof.

28. The method of claim 1 wherein the polyelectrolyte comprises a monomer wherein the monomer is acrylic acid, present in an amount of about 20% to about 35% by weight of the cement composition; the filler is manganese tetroxide, present in an amount of about 15% to about 50% by volume of the cement composition; the cross linking agent is trivalent aluminum, in an amount of about 0.7% to about 2% by weight of the cement composition; and the hardening agent is an azo-compound, present in an amount of about 0.001% to about 0.1% by weight of the cement composition.

29. A method of cementing comprising:
providing a cement composition that comprises:
a polyelectrolyte and/or an alkenoic acid first monomer; a filler; an azo-compound hardening agent; and a crosslinking agent;
placing the cement composition in a desired location; and
allowing the cement composition to set therein.

30. The method of claim 29 wherein the polyelectrolyte is formed from a second monomer.

31. The method of claim 29 wherein the alkenoic acid first monomer polymerizes to form a second polyelectrolyte.

32. The method of claim 29 wherein the polyelectrolyte is an anionic polyelectrolyte.

33. The method of claim 29 wherein the alkenoic acid first monomer has an acid functionality.

34. The method of claim 29 wherein the alkenoic acid first monomer comprises acrylic acid, methacrylic acid, itaconic acid, maleic acid, 3-butene-1,2,3-tricarboxylic acid, or combinations thereof.

35. The method of claim 29 wherein the alkenoic acid first monomer comprises sulfonate, phosphate, phosphonate, or combinations thereof.

36. The method of claim 30 wherein the second monomer comprises an acid functionality.

37. The method of claim 30 wherein the second monomer comprises acrylic acid, methacrylic acid, itaconic acid, maleic acid, 3-butene-1,2,3-tricarboxylic acid, or combinations thereof.

38. The method of claim 30 wherein the second monomer comprises sulfonate, phosphate, phosphonate, or combinations thereof.

39. The method of claim 29 wherein the polyelectrolyte is present in the cement composition in an amount in the range of from about 10% to about 75% by volume of the cement composition.

40. The method of claim 29 wherein the polyelectrolyte is present in the cement composition in an amount in the range of from about 20% to about 50% by volume of the cement composition.

41. The method of claim 29 wherein the filler comprises manganese tetroxide.

42. The method of claim 29 wherein the filler further comprises a non-active component.

43. The method of claim 42 wherein the non-active component comprises iron oxide, silica flour, flyash, or combinations thereof.

44. The method of claim 42 wherein the non-active component comprises up to about 75% by volume of the total filler.

45. The method of claim 29 wherein the filler is present in the cement composition in an amount in the range of from about 5% to about 65% by volume of the cement composition.

46. The method of claim 29 wherein the hardening agent comprises 2,2'-azobis[2-(2-imidazolin-2-yl)propane dihydrochloride; 2,2'-azobis(2-methylpropionamidine) dihydrochloride; 4,4'-azobis(4-cyanovaleric acid), 2,2'-azobis[2-methyl-N-(2-hydroxyethyl)propionamide, 1-[(1-cyano-1-methylethyl)azo]formamide; 2,2'-azobis[2-(5-methyl-2-imidazolin-2-yl)propane]dihydrochloride; 2,2'-azobis(2-methylpropionamidine) dihydrochloride; 1-[(1-cyano-1-methylethyl)azo]formamide; or combinations thereof.

47. The method of claim 29 further comprising an oxidizing compound comprising sodium persulfate, ammonium persulfate, t-butylhydroperoxide, hydrogen peroxide, or combinations thereof.

48. The method of claim 29 further comprising a reducing agent that comprises sodium thiosulfate, sodium bisulfite, triethanolamine or combinations thereof.

49. The method of claim 29 wherein the crosslinking agent is completely soluble.

50. The method of claim 29 wherein the crosslinking agent comprises a metal cation, an organic cation, or a combination thereof.

51. The method of claim 29 wherein the crosslinking agent comprises an aluminum cation.

52. The method of claim 29 wherein the crosslinking agent is present in the cement composition in an amount in the range of from about 0.01% to about 5% by volume of the cement composition.

53. The method of claim 29 wherein the cement composition further comprises water.

54. The method of claim 53 wherein the water is present in the cement composition in an amount up to about 50% by weight of the cement.

55. The method of claim 29 wherein the cement composition further comprises a fluid loss control additive, a defoamer, a dispersing agent, a retarder, a set accelerator, a rheology modifier, an inhibitor, a chain transfer agent, or a combination thereof.

56. The method of claim 29 wherein the polyelectrolyte comprises a monomer wherein the monomer is acrylic acid, present in an amount of about 20% to about 35% by weight of the cement composition; the filler is manganese tetroxide, present in an amount of about 15% to about 50% by volume of the cement composition; the cross linking agent is trivalent aluminum, in an amount of about 0.7% to about 2% by weight of the cement composition; and the hardening agent is an azo-compound, present in an amount of about 0.001% to about 0.1% by weight of the cement composition.

\* \* \* \* \*